United States Patent [19]
Nakamura et al.

[11] 3,929,950

[45] Dec. 30, 1975

[54] PROCESS FOR PRODUCING POROUS SYNTHETIC RESIN FILM AND SHEET

[75] Inventors: Tadashi Nakamura; Hisami Hagiwara, both of Iwaki, Japan

[73] Assignee: Kureha Kagaku Kogyo Kabushiki Kaisha, Tokyo, Japan

[22] Filed: June 21, 1973

[21] Appl. No.: 372,353

[30] Foreign Application Priority Data
June 22, 1972 Japan............................ 47-61790

[52] U.S. Cl.............. 264/49; 260/2.5 M; 264/41; 264/210 R
[51] Int. Cl.²............... B01D 47/00; F02M 11/00
[58] Field of Search............ 264/210 R, 41, 49; 260/2.5 M

[56] References Cited
UNITED STATES PATENTS

| | | | |
|---|---|---|---|
| 3,268,458 | 8/1966 | Strauss et al.................. | 106/122 |
| 3,376,238 | 4/1968 | Gregorian et al............. | 260/2.5 M |
| 3,576,686 | 4/1971 | Schmidle et al............... | 260/2.5 M |
| 3,657,115 | 4/1972 | Manjikian et al.............. | 264/41 |
| 3,669,931 | 6/1972 | Annis et al..................... | 264/210 R |
| 3,725,520 | 4/1973 | Suzuki et al. .................. | 264/210 R |
| 3,734,986 | 5/1973 | Kato et al....................... | 260/2.5 M |
| 3,738,904 | 6/1973 | Ikeda et al..................... | 264/289 |
| 3,745,202 | 7/1973 | Riggleman et al............. | 264/41 |
| 3,795,720 | 3/1974 | Schwarz......................... | 264/41 |

Primary Examiner—Ronald W. Griffin
Attorney, Agent, or Firm—Sughrue, Rothwell, Mion, Zinn & Macpeak

[57] ABSTRACT

A process for producing a porous synthetic resin film or sheet which comprises stretching, at least uniaxially, a melt molded article of a synthetic resin composition containing at least 50% by weight of a powder of an inorganic material which is capable of being eluted and removing the powder of inorganic material from the stretched article by elution with a solvent for the inorganic material is disclosed the stretching forms fine cracks between the resin and the inorganic material.

7 Claims, No Drawings

PROCESS FOR PRODUCING POROUS SYNTHETIC RESIN FILM AND SHEET

BACKGROUND OF THE INVENTION

1. Field of the Invention

This invention relates to a process for producing a porous synthetic resin film or sheet having continuous pores. More particularly, this invention relates to a process for producing a porous synthetic resin film or sheet which comprises stretching, at least uniaxially, a melt molded article such as a film or sheet of a synthetic resin composition containing at least 50% by weight of an inorganic powder which is capable of being eluted and removing the inorganic powder from the stretched article by elution with a solvent for the inorganic powder.

2. Background of the Invention

Hithertofore, it was known that a porous synthetic resin film or sheet having continuous pores can be produced by a wide variety of methods such as a mechanical perforation method, a powder calcination method, a lamination of fibrous materials (non-woven fabrics, paper, etc.), a gelation method, a method comprising eluting and removing a material which is capable of being eluted with a solvent from a mold containing a large amount of the above material, and the like. However, these known methods still have various disadvantageous, and at present a specific method is carefully selected depending upon the utility and purpose of the final porous products.

Of these methods for producing porous films or sheets, a technique comprising the elution of soluble materials with a solvent therefor from the molded synthetic resin articles is relatively expedient in operation and is used for producing a porous film or sheet having a number of uniform and fine pores. In particular, an inorganic material which is relatively cheap and which can be eluted with water, an acid or an alkali, etc., such as a sodium salt, a potassium salt, a calcium salt, a magnesium salt and the like, is advantageously used for producing a porous film or sheet because the process can be conducted economically.

Generally speaking, however, in molding a composition of an inorganic powder which is insoluble in the resin and a synthetic resin, most of powders of the inorganic material are present in the inner phase of the molded article of the synthetic resin in the occluded state thereby requiring a long period of time for eluting the occluded inorganic material. Also, the maximum porosity obtainable by the conventional process is necessarily limited to the volume of the inorganic material initially contained in the resin composition. On the other hand, the processability and moldability of the resin composition becomes more difficult as the proportion of the inorganic material contained therein increases. In addition, though the size of pores is mainly determined by the size of the powder of inorganic materials, the use of inorganic materials having a large particle size for the formation of large pores often makes the uniform blending of the resin composition difficult. Accordingly, in the conventional elution technique, it is very difficult to obtain a diameter and a porosity over a certain limitation.

SUMMARY OF THE INVENTION

The present invention is directed to an improvement in the well-known processes for producing a porous film or sheet in order to eliminate the disadvantages associated with the prior art technique which comprises eluting a powder of an inorganic material from a thermoplastic article containing more than 50% by weight of the powder of inorganic material based on the total weight of the thermoplastic article.

DETAILED DESCRIPTION OF THE INVENTION

It is well known to those skilled in the art that a molded resin article breaks when it is stretched to an extent exceeding the maximum elongation of the molded resin at a temperature below the melt flow temperature of the resin. In the molded thermoplastic resin article containing a large proportion of an inorganic material, it is considered that a partial exfoliation occurs in a boundary surface between the inorganic material and the resin prior to the breaking when the molded resin article is subjected to the stretching, and fine cracks may form between the resin and the inorganic material.

As a result of extensive investigations on the formation of cracks, it is found that a film or sheet having continuous pores and a high porosity can easily be obtained by subjecting a molded film or sheet containing a powder of an inorganic material to a stretching prior to elution of the powder of inorganic material, as compared with a film or sheet which is subjected directly to elution without stretching. That is, the process of this invention comprises stretching a molded film or sheet of the thermoplastic resin composition containing a powder of an inorganic material, which is capable of being eluted with a solvent for the inorganic material, to an extent exceeding the elastic limit of the thermoplastic resin but not exceeding the maximum limit over which the molded film or sheet would break, and eluting the powder of inorganic material from the stretched film or sheet with an appropriate solvent which dissolves the inorganic material.

As described previously, a certain exfoliation occurs in a boundary surface between the inorganic material and the thermoplastic resin when the molded article containing them is subjected to stretching. In particular, the degree of exfoliation varies depending upon various factors such as the adhesive strength between the resin and the inorganic material, the shape and size of the powder of inorganic material, the stretchability and crystallinity of the thermoplastic resin, and the type and amount of additives such as a lubricant, etc. and, therefore, it is possible to obtain a porous film or sheet having an extremely high porosity by suitably selecting the type and amount of components of the resin composition.

To describe the above factors in greater detail, the adhesion between the inorganic material and the thermoplastic resin is generally due to a surface reaction between both and, in the present invention, it is preferred to use a powder of an inorganic material which does not react with the thermoplastic resin used. The term "reaction" used herein also includes the decomposition and/or the acceleration of oxidation of the resin due to the incorporation of the inorganic material. Further, an individual powder particle of the inorganic material is desirably monocrystal since the exfoliation between the inorganic material and the thermoplastic resin occurs more easily when the particles are crystals having a smooth surface. In addition, a rod-type monocrystal is particularly preferred because the inorganic material having such a rod-type crystalline shape generally tends to be oriented in the direction of stretching thereby forming "shear" in the boundary surface between the crystal and the resin. The "shear" appears to become larger as the size of the crystal increases.

In one embodiment, a film or sheet obtained from a polyethylene composition containing 50 to 85% by weight of a powder of calcium sulfite as rod crystals having a maximum width of 1 to 10$\mu$ and a minimum length of 5 to 100$\mu$ can be uniaxially stretched up to a stretching ratio of 3 to 10 at a temperature of from room temperature to 150°C and the specific gravity of the stretched film decreases to less than 1 (in some cases, near 0.3 at minimum) as compared with the specific gravity of 1.39 to 1.90 of the same polyethylene composition before stretching. The film sometimes becomes to be porous and to have continuous pores when it is subjected only to such a high degree of stretching, but in this case, calcium sulfite in the stretched film can easily be eluted with an aqueous solution of an inorganic acid such as hydrochloric acid, nitric acid, sulfurous acid and the like to obtain a highly porous polyethylene film. In accordance with the process of this invention, such porous films or sheets can be obtained by using other inorganic materials which are soluble in acids, alkalis or water, for example, oxides, hydroxides, halides, carbonates, sulfates and sulfites of sodium, potassium, magnesium, calcium, strontium, barium, zinc, tin, aluminum, chromium, manganese, iron, cobalt, nickel, copper and the like, more especially, calcium carbonate, sodium chloride, potassium chloride, iron oxide and the like, as well as a powder of metals such as zinc, lead, tin, aluminum, iron and the like, and other thermoplastic resins such as a polyolefin, e.g., polypropylene, polyvinyl chloride, polyvinyl fluoride, polyvinylidene fluoride, polyethylene tetrafluoride, polystyrene, polyamides and the like.

The particle size of a powder of inorganic materials can appropriately be selected depending upon the desired pore size in the final porous film or sheet, but generally, a powder of inorganic materials having a particle size of from 0.1 to 1000$\mu$ is advantageously used in the present invention.

The stretching of the film or sheet can be effected by any conventional procedure which is well-known in the art, for example, by a roll stretching, a tenter stretching and a press roll stretching and the like. The stretching can be uniaxially or biaxially.

In accordance with the process of this invention, the elution of the inorganic material from the film or sheet can easily be conducted by subjecting it to stretching, and also the porosity of the resulting film or sheet can easily be controlled over a wide range. Further, a film having a porosity of several times the volume of the inorganic material can be obtained when a combination of a powder of the inorganic material and a thermoplastic resin is suitably selected so as to obtain an easy exfoliation in a boundary surface between the inorganic material and the thermoplastic resin and to obtain a high stretching ratio.

As described previously, the exfoliation in a boundary surface between the inorganic material and the thermoplastic resin in stretching of the molded article varies depending upon various factors such as the adhesive strength between the resin and the inorganic material, the shape and size of a powder of the inorganic material, the stretchability and crystallinity of the thermoplastic resin, and the type and amount of additives such as a lubricant, etc. Generally, preferred thermoplastic resins are those having poor adhesiveness to the inorganic material used, and preferred inorganic materials are those having no oxidation activity on the resin, no catalytic activity on the oxidation or no reactivity with the resin. The powder of inorganic materials is preferably in the form of monocrystals having a smooth surface. Other additives such as a lubricant and a stabilizer may be used in the resin composition in order to decrease an affinity between the thermoplastic resin and the inorganic material and to prevent an adhesion of the resin to the inorganic material due to the oxidation of the resin, respectively.

It is apparent that a high stretching ratio of the film or sheet can be obtained by using a resin having a high elongation, and the resin which can be oriented and fibrillated upon stretching is more preferred since the cracks by fibrillation and the exfoliation in a boundary surface permit an easy elution of the inorganic material contained in the stretched film or sheet.

Preferred inorganic materials include sodium chloride, potassium chloride, calcium sulfite semihydrate, calcium carbonate and the like since they have a cubic or rectangular crystal form and are inert against most of the thermoplastic resins and soluble in water or an acid. However, inorganic materials having other crystal shapes or a polycrystal form can also produce a certain degree of exfoliation in a boundary surface between the thermoplastic resin and the inorganic material upon stretching and, even with these inorganic materials, the stretching ratio can be increased by the aid of lubricants.

The resins which can be used in the present invention include a polyolefin resin such as polyethylene, polypropylene and the like, a vinyl or vinylidene resin such as polyvinyl chloride, vinylidene chloride-vinyl chloride copolymer, polyvinyl fluoride, polyvinylidene fluoride and the like, a haloethylene resin such as polyethylene chloride trifluoride, polyethylene tetrafluoride, ethylene-ethylene tetrafluoride copolymer and the like, a polystyrene resin, a polyamide resin and other thermoplastic resins. It is to be noted that any thermoplastic resin which is capable of forming a film or sheet can be used in the present invention, and the present invention is not limited to the use of specific thermoplastic resins enumerated above.

The present invention is further illustrated by the following examples, but they are not to be construed as limiting the scope of this invention.

EXAMPLE 1

70 parts by weight of calcium sulfite semihydrate as rod crystals having a size of about 10$\mu$ width and 30$\mu$ length and 30 parts by weight of a commercial polyethylene having a melt index of 0.3 and a true specific gravity of 0.96 were kneaded by a heat roll having a surface temperature of 160°C, and the resulting mixture composition was press-molded at a temperature of 180°C under a pressure of 100 kg/cm$^2$ to prepare a press plate having a thickness of about 1 mm. Four rectangular samples were cut from the above press plate, and three of them were stretched uniaxially and immersed in hydrochloric acid to elute calcium sulfite while one sample was subjected directly to elution of calcium sulfite without stretching. Then, the percent porosity was determined for each of the resulting porous films. In the above experiments, the stretching was conducted at a temperature of from 80° to 90°C and elution of calcium sulfite was conducted in 3N hydrochloric acid until the weight of samples decreased to less than 32% (percent weight ratio of the dried sample after elution to the sample before elution). The stretched samples had a percent weight ratio of about 33% after 1 hour elution and a percent weight ratio less than 32% at a constant value after two hours elution. On the other hand, the sample which had not been subjected to stretching showed a percent weight ratio of about 50% even after 3 hours elution and the sample required nearly 40 hours before the percent weight ratio reached less than 32%.

An apparent specific gravity (Da) and a true specific gravity (Dt) were determined for each of the samples, and the porosity (G%) was calculated by the following formula:

$$G(\%) = \left(1 - \frac{Da}{Dt}\right) \times 100$$

The results obtained are shown in Table 1 below together with a ratio of pore volume to polyethylene volume (1).

Table 1

| Sample No. | Stretching Ratio | % Porosity | Ratio of Pore Volume to Polyethylene Volume (as 1) |
|---|---|---|---|
| 1 (Control) | 0.97 | 44.9 | 0.81 |
| 2 | 1.54 | 63.1 | 1.71 |
| 3 | 2.51 | 74.3 | 2.76 |
| 4 | 3.32 | 78.2 | 3.59 |

In the results shown in Table 1, the stretching ratio represents the ratio of length in the direction of stretching, i.e., the length of the final porous film/the length of the unstretched plate sample. Sample No. 1 (unstretched control) was subjected only to elution of calcium sulfite and showed a slight shrinkage in volume. As is clear from the results, the porosity is significantly increased by stretching. Also, it appears that the increase in porosity tends to be saturated in the stretching ratios greater than 3.

EXAMPLE 2

6 parts by weight of liquid paraffin were added to 70 parts by weight of calcium sulfite semihydrate as rod crystals having a size of 2μ width and 10–20μ length and 30 parts by weight of a commercial polyethylene having a melt index of 0.3 and a true specific gravity of 0.96, and a press plate having a thickness of 1.2 mm was prepared from the resulting mixture in the same manner as described in Example 1. The thus obtained press plate was then pressed until the thickness became 1 mm by a hot roll having a surface temperature of about 90°C and then stretched to a stretching ratio of about 2.7 in the same direction at a temperature of 90°C.

The porous film obtained after elution of calcium sulfite with hydrochloric acid was found to have a porosity of 74.1%.

EXAMPLE 3

8 parts by weight of liquid paraffin were added to 60 parts by weight of a commercial heavy calcium carbonate having a particle size of about 1μ and 40 parts by weight of polyethylene having a melt index of 0.3 and a true specific gravity of 0.96, and press plate having a thickness of 1.2 mm was prepared from the resulting mixture in the same manner as described in Example 1. The thus obtained press plate was then pressed until the thickness became about 1 mm by a hot roll having a surface temperature of about 90°C and then stretched to a stretching ratio of about 2.4 in the same direction at a temperature of 90°C.

The porous film obtained after elution of calcium sulfite with hydrochloric acid was found to have a porosity of 60%.

EXAMPLE 4

A press plate was prepared in the same manner as described in Example 1 from a mixture of 70 parts by weight of a commercial sodium chloride having a particle size of from 100 to 200 μ and 30 parts by weight of polyethylene. The resulting press plate was then stretched to a stretching ratio of about 1.6 at a temperature of 90°C, and then sodim chloride was removed in running water. The thus obtained porous film was found to have a porosity of 64.7%.

EXAMPLE 5

10 parts by weight of dimethyl phthalate was added to 68 parts by weight of calcium sulfite semihydrate as rod crystals having a size of about 10 μ width and about 30 μ length and 32 parts by weight of polyvinylidene fluoride (manufactured by Kureha Kagaku Kogyo, K.K., Japan; an average degree of polymerization, 1100), and the resulting mixture was kneaded by a heat roll having a surface temperature of 165°C. The mixture composition thus obtained was then pressmolded at a temperature of 200°C under a pressure of 100Kg/cm² to prepare a press plate having a thickness of about 3 mm. The plate was pressed to a stretching ratio of 1.3 by a hot roll having a surface temperature of 140°C and then stretched in the same direction to a stretching ratio of about 2 at a temperature of 140°C. The resulting film was then immersed in hydrochloric acid to elute calcium sulfite to give a porous film having a porosity of 81%.

While the invention has been described in detail and with reference to specific embodiments thereof, it will be apparent to one skilled in the art that various changes and modifications can be made therein without departing from the spirit and scope thereof.

What is claimed is:
1. In a process for producing a porous synthetic thermoplastic resin film or sheet which exhibits a continuous porous structure which comprises eluting a melt molded article of a synthetic thermoplastic resin composition which consists essentially of a synthetic thermoplastic resin selected from the group consisting of a polyolefin and polyvinylidene fluoride containing 50% to 85% by weight of calcium sulfite powder as rod-shaped crystals having a maximum width of 1 to 10 μ and a minimum length of 5 to 100 μ to remove the calcium sulfite from the stretched article by elution with a solvent for the calcium sulfite, the improvement comprising stretching said melt molded article uniaxially at a stretch ratio of 3 to 10 and at a temperature of from room temperature to 150°C prior to the elution of the calcium sulfite, said stretching being to an extent exceeding the elastic limit of the resin but not exceeding the maximum limit over which the melt molded article breaks to thereby form fine cracks between the resin and the calcium sulfite to increase the ease of elution, whereby said continuous porous structure is obtained, the specific gravity of the stretched film decreasing to less than 1, the specific gravity of said film prior to stretching being 1.39 to 1.90.

2. A process accordingly to claim 1 wherein said calcium sulfite powder is monocrystal in form with a smooth surface, whereby exfoliation is increased between said calcium sulfite powder and said synthetic thermoplastic resin, resulting in increased porosity.

3. A process according to claim 1 whereby during said stretching said rod-like monocrystal calcium sulfite powder is oriented in the direction of stretching thereby causing shear in the boundary surface between the calcium sulfite powder and said synthetic thermoplastic resin.

4. A process according to claim 1 wherein said synthetic thermoplastic resin composition is rendered porous upon stretching, the porosity being further increased by said elution.

5. A process according to claim 1 consisting of the steps of stretching and eluting.

6. The process of claim 1, wherein said synthetic thermoplastic resin is polypropylene.

7. In a process for producing a porous synthetic thermoplastic resin film or sheet which exhibits a continuous porous structure which comprises eluting a melt molded article of a synthetic thermoplastic resin composition which consists essentially of polyethylene containing 50 to 85% by weight of calcium sulfite powder as rod-shaped crystals having a maximum width of 1 to 10 $\mu$ and a minimum length of 5 to 100 $\mu$ to remove the calcium sulfite from the stretched article by elution with a solvent for the calcium sulfite, the improvement comprising stretching said melt molded article uniaxially at a stretch ratio of 3 to 10 and at a temperature of from room temperature to 150°C prior to the elution of the calcium sulfite, said stretching being to an extent exceeding the elastic limit of the resin but not exceeding the maximum limit over which the melt molded article breaks to thereby form fine cracks between the resin and the calcium sulfite to increase the ease of elution, whereby said continuous porous structure is obtained, the specific gravity of the stretched film decreasing to less than 1, the specific gravity of said film prior to stretching being 1.39 to 1.90.

* * * * *